United States Patent
Yu et al.

(10) Patent No.: US 12,214,498 B2
(45) Date of Patent: Feb. 4, 2025

(54) ROBOT JOINT TORQUE CONTROL SYSTEM AND LOAD COMPENSATION METHOD THEREFOR

(71) Applicant: Beijing Institute of Technology, Beijing (CN)

(72) Inventors: Zhangguo Yu, Beijing (CN); Qiang Huang, Beijing (CN); Yaliang Liu, Beijing (CN); Yuyu Zuo, Beijing (CN); Xuechao Chen, Beijing (CN); Gao Huang, Beijing (CN); Han Yu, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 248 days.

(21) Appl. No.: 17/908,238

(22) PCT Filed: May 9, 2020

(86) PCT No.: PCT/CN2020/089342
§ 371 (c)(1),
(2) Date: Aug. 31, 2022

(87) PCT Pub. No.: WO2021/184517
PCT Pub. Date: Sep. 23, 2021

(65) Prior Publication Data
US 2023/0158669 A1 May 25, 2023

(30) Foreign Application Priority Data

Mar. 17, 2020 (CN) .......................... 202010186117.9

(51) Int. Cl.
*B25J 9/00* (2006.01)
*B25J 9/16* (2006.01)
(Continued)

(52) U.S. Cl.
CPC ............ *B25J 9/1633* (2013.01); *B25J 13/085* (2013.01); *G05B 19/4155* (2013.01); *G05B 2219/39188* (2013.01)

(58) Field of Classification Search
None
See application file for complete search history.

(56) References Cited

U.S. PATENT DOCUMENTS 4,868,472 A * 9/1989 Daggett ............. G05B 19/4141
318/575
4,925,312 A 5/1990 Onaga et al.
(Continued)

FOREIGN PATENT DOCUMENTS

CN 104111664 B 8/2016
CN 106335076 A 1/2017
(Continued)

*Primary Examiner* — Truc M Do
(74) *Attorney, Agent, or Firm* — Bayramoglu Law Offices LLC (57) ABSTRACT

A robot joint torque control system and a load compensation method therefor are provided, which relate to the technical field of robot joint motion control. A mathematical model of the robot joint torque control system is established first. Equivalent transformation is performed on a system functional block diagram thereof, and then it can be seen that load parameters have a great influence on joint torque output. A load compensation controller is designed to effectively eliminate the influence of the load parameters on an output torque of the joint. The system is equivalent to an inertial element on the basis of the compensation, and then a PD controller parameter is adjusted to increase an open-loop gain of the system, so as to increase a system bandwidth and increase a response speed of the joint torque control system, thereby improving performance of the joint torque control system.

6 Claims, 5 Drawing Sheets

(51) Int. Cl.
    *B25J 13/08*       (2006.01)
    *G05B 19/4155*     (2006.01)

(56) References Cited

U.S. PATENT DOCUMENTS

| | | | | |
|---|---|---|---|---|
| 2008/0258670 | A1* | 10/2008 | Yoshikawa | G05B 19/40 |
| | | | | 318/568.22 |
| 2016/0158601 | A1 | 6/2016 | Lee et al. | |
| 2017/0040916 | A1* | 2/2017 | Yoshiura | H02P 29/10 |
| 2017/0346370 | A1* | 11/2017 | Sentis | H02K 5/203 |
| 2018/0239327 | A1* | 8/2018 | Yamamoto | G05B 5/01 |
| 2020/0101596 | A1* | 4/2020 | Ito | B25J 9/1025 |

FOREIGN PATENT DOCUMENTS

| | | | |
|---|---|---|---|
| CN | 107901037 | A | 4/2018 |
| CN | 109108954 | A | 1/2019 |
| CN | 109445416 | A | 3/2019 |
| CN | 109664297 | A | 4/2019 |
| CN | 110394801 | A | 11/2019 |
| JP | H08252787 | A | 10/1996 |
| JP | 2002291272 | A | 10/2002 |

\* cited by examiner

ROBOT JOINT TORQUE CONTROL SYSTEM AND LOAD COMPENSATION METHOD THEREFOR

CROSS REFERENCE TO THE RELATED APPLICATIONS

This application is the national phase entry of International Application No. PCT/CN2020/089342, filed on May 9, 2020, which is based upon and claims priority to Chinese Patent Application No. 202010186117.9, filed on Mar. 17, 2020, the entire contents of which are incorporated herein by reference.

TECHNICAL FIELD

The present disclosure belongs to the technical field of robot joint motion control, and specifically, relates to a robot joint torque control system and a load compensation method therefor.

BACKGROUND

In recent years, robots have been more and more widely used in all walks of life, so that the research of robots has become a hot spot. Common drive modes for robots include motor drive, hydraulic drive, and pneumatic drive. Motor drive has the advantages of compact structure, simple control, high transmission efficiency, and high control accuracy, and is the most common drive mode in the field of robots at present. A joint of a robot is usually formed by a servo motor, a gear reducer, an encoder, and so on, and uses a typical position control system. However, a large rigid impact is caused if the position control system is still used when a foot of the robot touches the ground or an obstacle, which causes instability in operations such as walking and running of the robot. At this time, the joint must switch to a torque control system, so as to effectively mitigate the impact and improve the overall stability of the robot.

Currently, the following several torque control solutions exist: ① a series elastic actuator (SEA): elastic components are connected in series between a drive end and a joint load end, having significant advantages such as low output impedance and impact resistance, but having a low output bandwidth and a small output torque. ② MIT Cheetah uses a quasi direct drive, uses a solution of high-torque motor+small-reduction-ratio reducer, and uses internal current loop feedback to realize low-cost force control, and is currently only used in small quadruped robots. ③ A joint drive unit uses a control solution of high-torque servo motor+large-reduction-ratio reducer+torque sensor, and realizes large torque output, thereby satisfying high dynamic tasks such as fast walking, running, and jumping of heavy robots.

In order to realize high dynamic tasks of robots, the control solution of high-torque servo motor+large-reduction-ratio reducer+torque sensor must be used. Currently, robot joint torque control systems often use control methods such as PD control, quantitative feedback control, and robust control. PD control is currently one of the most common control methods in engineering projects, in which adjustment is made based on an error input to a control system, without the need to model a controlled object, and meanwhile, simple debugging and easy implementation are realized. However, when PD control is used alone, in order to achieve better control performance, control parameters are often set to be excessively large, which easily causes system instability. Such a method still needs to be used together with other compensation control methods, so as to achieve better control performance. Moreover, although various advanced control methods such as quantitative feedback control and robust control can achieve a desirable control effect, the control methods have complex models, and the research work thereof is mostly simulation analysis or confined to laboratories.

SUMMARY

In view of the deficiencies in the prior art, the present disclosure provides a robot joint torque control system and a load compensation method therefor, which eliminate the influence of load parameters on actual torque output of the system and improve performance of the joint torque control system.

The present disclosure achieves the aforementioned technical objective by the following technical means.

A load compensation method for a robot joint torque control system includes accumulating a current $i_f$ whose joint-end velocity is compensated for by a load compensation controller and an original current loop input instruction $i_r$, and then using the accumulated current as a current loop input instruction of a joint torque control system to effectively compensate for an influence of load parameters on an output torque of the joint torque control system.

Further, the load compensation controller is $$G_f(s) = \frac{nK_v}{K_a},$$

wherein n is a reduction ratio of a gear reducer, $K_v$ is a velocity feedback coefficient of a servo motor, and $K_a$ is a current loop control parameter.

Furthermore, an open-loop transfer function of the joint torque control system is:

$$G(s) = \frac{T_p}{E_T} = \frac{nK_tK_aK_{PD}}{Ls+R+K_aK_t} = \frac{\frac{nK_tK_aK_{PD}}{R+K_aK_t}}{\frac{s}{\omega}+1} = \frac{K_o}{\frac{s}{\omega}+1}$$

wherein a corner frequency of an inertial element:

$$\omega = \frac{R+K_aK_t}{L},$$

an open-loop gain $$K_o = \frac{K_{PD}nK_tK_a}{R+K_aK_t},$$

$K_{PD}$ is a PD controller parameter, $K_t$ is a torque coefficient of the servo motor, L is an inductance of the servo motor, and R is a resistance of the servo motor.

Furthermore, when the PD controller parameter $K_{PD}$ is increased, the open-loop gain $K_o$ of the system increases accordingly, and a cutoff frequency when the joint torque control system passes through a 0 db line increases; that is, a system bandwidth increases, thereby improving rapidity of the system.

A joint torque control system includes a joint body and a control system, wherein the joint body includes a servo motor, a gear reducer, a torque sensor, and an absolute encoder, an output shaft of the servo motor is rigidly and fixedly connected to the gear reducer, the gear reducer is rigidly connected to a joint-end load by means of the torque sensor, and the absolute encoder is mounted at the joint-end load; the control system includes a first comparator, a torque loop controller, a second comparator, and a current loop controller that are sequentially in signal connection.

In the aforementioned technical solution, the torque sensor is used for detecting an actual torque of a joint end; a current sensor is mounted inside the servo motor and used for detecting an actual output current of the servo motor; and the absolute encoder is used for detecting an actual position of the joint-end load.

In the aforementioned technical solution, in the control system, a given current and the actual output current of the servo motor are compared and subtracted, and pass through the second comparator to control current output of the servo motor and form an internal current loop; a given torque and the actual torque of the joint end are compared and subtracted, and then pass through the first comparator and the internal current loop to control joint torque output and form an external torque loop.

The beneficial effects of the present disclosure are: in the present disclosure, first, mathematical modeling is performed on a robot joint torque control system, and equivalent transformation is performed on a system control functional block diagram thereof to obtain by analysis that load parameters have a certain influence on actual torque output; then, a load compensation controller is designed to eliminate the influence of the load parameters on the actual torque output of the system; the system is equivalent to an inertial element on the basis of the compensation, and a PD controller parameter is adjusted to increase an open-loop gain of the system, so as to increase a system bandwidth, thereby improving performance of the joint torque control system. The compensation method of the present disclosure does not need to build a complex mathematical model, is easy to apply and is especially suitable for use in engineering projects.

DETAILED DESCRIPTION OF THE EMBODIMENTS

The present disclosure is further illustrated below with reference to the accompanying drawings and specific embodiments, but the protection scope of the present disclosure is not limited thereto.

Figure 1:
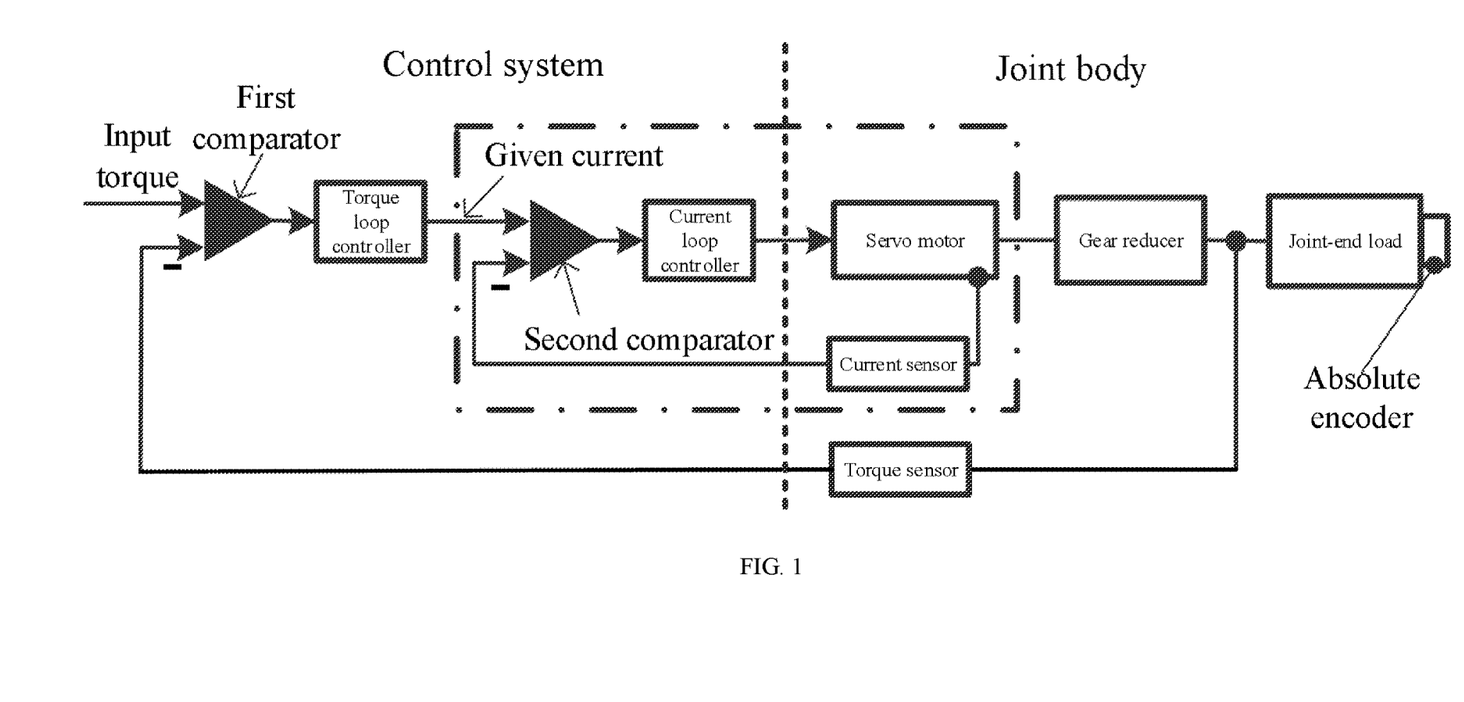
FIG. 1 is a diagram of a robot joint torque control system in the present disclosure.

As shown in FIG. 1, a robot joint torque control system is formed by a joint body and a control system. The joint body is formed by a servo motor, a gear reducer, a torque sensor, and an absolute encoder, an output shaft of the servo motor is rigidly and fixedly connected to the gear reducer, the gear reducer is rigidly connected to a joint-end load by means of the torque sensor, and the torque sensor is used for detecting an actual torque of a joint end; a current sensor is mounted inside the servo motor and used for detecting an actual output current of the servo motor; and the absolute encoder is mounted at the joint-end load and used for detecting an actual position of the joint-end load. The control system is formed by a first comparator, a torque loop controller, a second comparator, and a loop current controller. A given current and the actual output current of the servo motor are compared and subtracted, and then pass through the second comparator to control current output of the servo motor and form an internal current loop; a given torque and the actual torque of the joint end are compared and subtracted, and then pass through the first comparator and the internal current loop to control joint torque output and form an external torque loop.

According to a functional diagram of the robot joint torque control system, mathematical modeling on the robot torque control system is as follows:

The servo motor uses a current closed loop, and has an output voltage $U_c$ being:

$$U_c = K_a(i_r - K_f i_a) \tag{1}$$

where $K_a$ is a current loop control parameter, $i_r$ is a current loop input instruction, $K_f$ is a circuit loop feedback coefficient of the servo motor, and $i_a$ is an actual current value; the current loop input instruction $i_r$ is obtained by multiplying a joint torque error $E_T$ and a PD controller parameter $K_{PD}$, and the joint torque error $E_T$ is obtained by subtracting a given torque $T_r$ of the joint and an actual torque $T_p$ of the joint end.

A voltage balance equation of the servo motor is:

$$U_c = E + L\frac{di_a}{dt} + Ri_a \tag{2}$$

where E is a counter electromotive force of the servo motor, and $$E = nK_v\frac{d\theta}{dt},$$

n is a reduction ratio of the gear reducer, $K_v$ is a velocity feedback coefficient of the servo motor, $\theta$ is an actual position of the joint end, $$\frac{d\theta}{dt}$$

is an actual velocity of the joint end, L is an inductance of the servo motor, and R is a resistance of the servo motor.

An output torque of the servo motor is:

$$T_m = i_a K_t \tag{3}$$

where $K_t$ is a torque coefficient of the servo motor.

Since the torque sensor has large rigidity, the elastic deformation thereof is neglected, and then a relationship between outputs of the motor output end and the actual torque of the joint end is:

$$T_p = nT_m \tag{4}$$

where $T_m$ is the output torque of the servo motor, and $T_p$ is the actual torque of the joint end.

A torque balance equation of the joint end is:

$$T_p = J_m \frac{d\theta^2}{dt} + B_m \frac{d\theta}{dt} + G \tag{5}$$

where $J_m$ is a total moment of inertia converted to the joint-end load, and is a sum of converted moments of inertia of the load, the torque sensor, the gear reducer, the servo motor, and other components, $B_m$ is a total viscous damping coefficient converted to the joint-end load, and is a sum of converted viscous damping coefficients of the load, the gear reducer, and the servo motor, and G is a gravity term of the joint end; regarding the gravity term G of the joint end, the influence of the gravity term on the system output is eliminated by a method such as gravity compensation (in the prior art), and the influence of the gravity term is not considered in the present disclosure.

Figure 2:
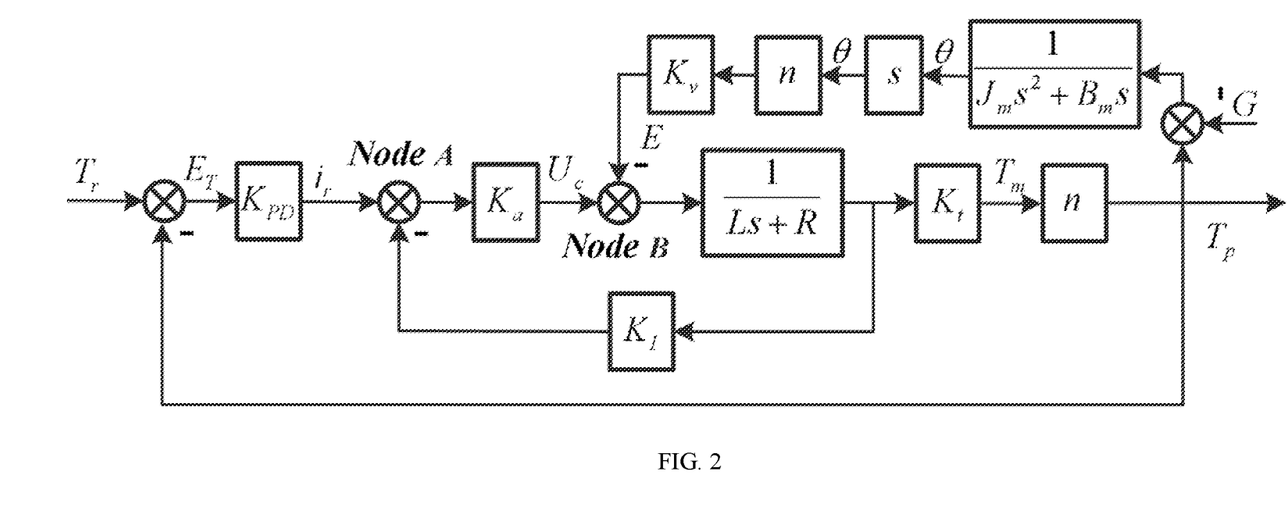
FIG. 2 is a functional block diagram of the robot joint torque control system in the present disclosure.

Equations (1) to (5) are combined and subjected to Laplace transformation to establish a functional block diagram of the robot joint torque control system, as shown in FIG. 2.

Figure 3:
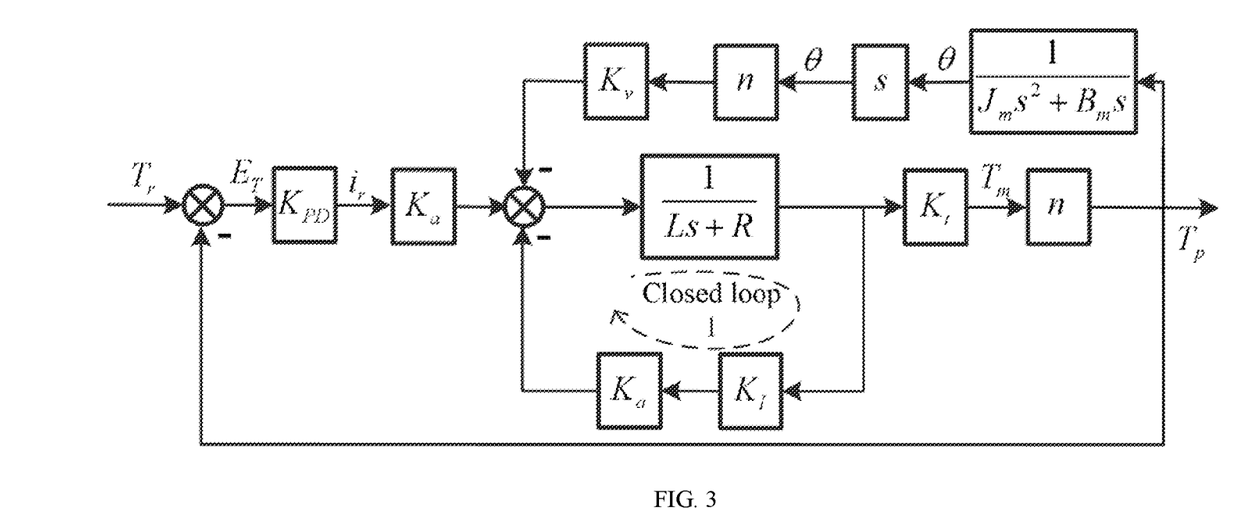
FIG. 3 is a block diagram of the joint torque control system in the present disclosure after primary transformation.

Equivalent transformation is performed on the block diagram of FIG. 2, a node A is moved backward (across $K_a$) to a node B to obtain a block diagram of the joint torque control system after primary transformation, as shown in FIG. 3.

Figure 4:
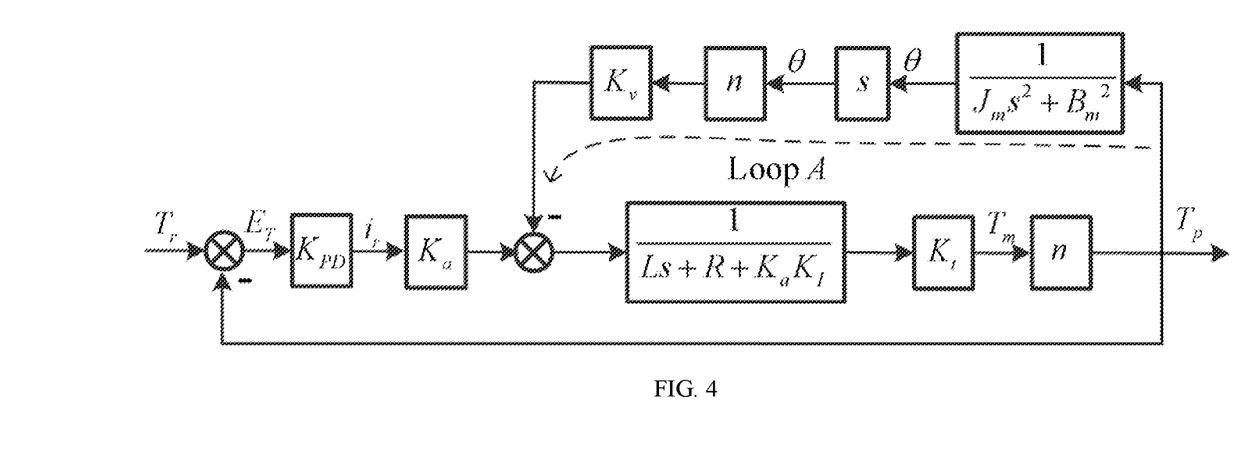
FIG. 4 is a block diagram of the joint torque control system in the present disclosure after secondary transformation.

Since the closed loop 1 in FIG. 3 is a typical closed-loop feedback loop, arrangement is made according to simplified rules for closed-loop feedback to obtain a block diagram of the joint torque control system after secondary transformation, as shown in FIG. 4.

It can be seen from FIG. 4 that load parameters $J_m$ and $B_m$ have a certain influence on actual torque output of the system through a loop A (the load parameters reduce the actual torque output of the system), and the larger the load parameters, the larger the disturbing influence on the actual output torque of the system.

Figure 5:
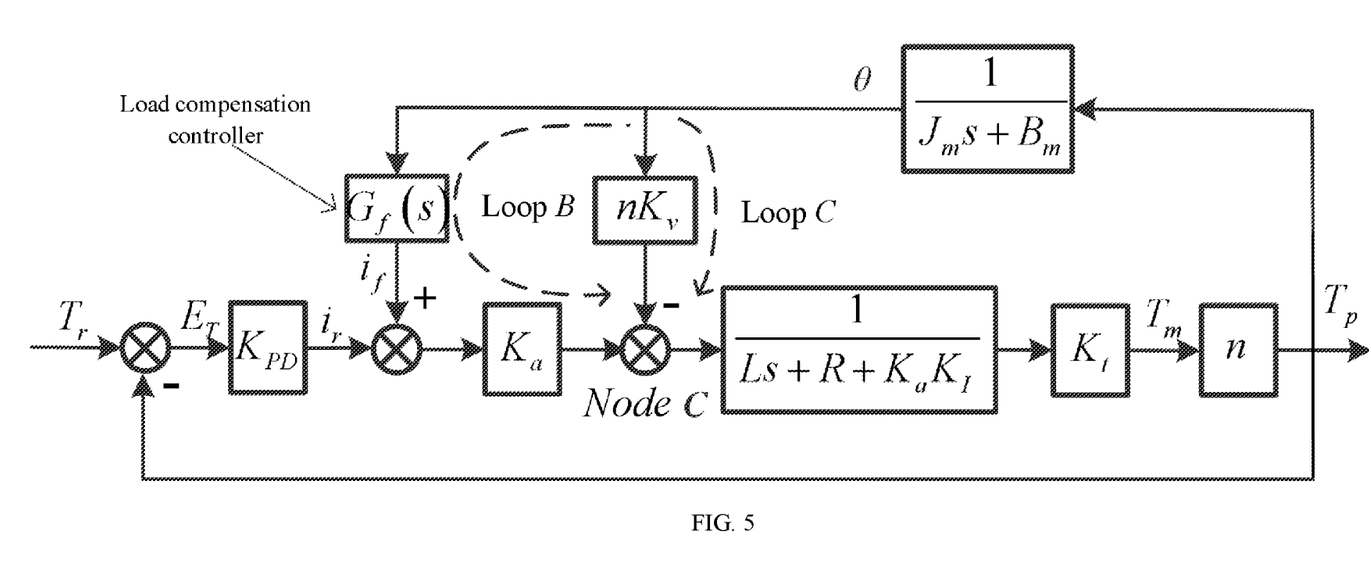
FIG. 5 is a block diagram of the joint torque control system in the present disclosure with a load compensation controller added thereto.

In order to eliminate the influence of the load parameters on the joint torque control system, a load compensation controller is designed, a current $i_f$ whose signal value of a joint-end velocity (which may be obtained after differential processing is performed on an actual position signal $\theta$ of the joint end) is compensated for by the load compensation controller is selected, and $i_f$ and $i_r$ are added and then used as a current loop input instruction. The principle is as follows: at a node C, a value of $\dot{\theta}$ after passing through a loop C and a value of $\dot{\theta}$ after passing through a loop B are equal in size and opposite in sign, so that they cancel each other out, thereby eliminating the influence of the load parameters on the force control system, as shown in FIG. 5.

At the node C:

$$\dot{\theta} nK_v = \dot{\theta} G_f(s) K_a \tag{6}$$

Thus, the load compensation controller is:

$$G_f(s) = \frac{nK_v}{K_a} \tag{7}$$

Figure 6:
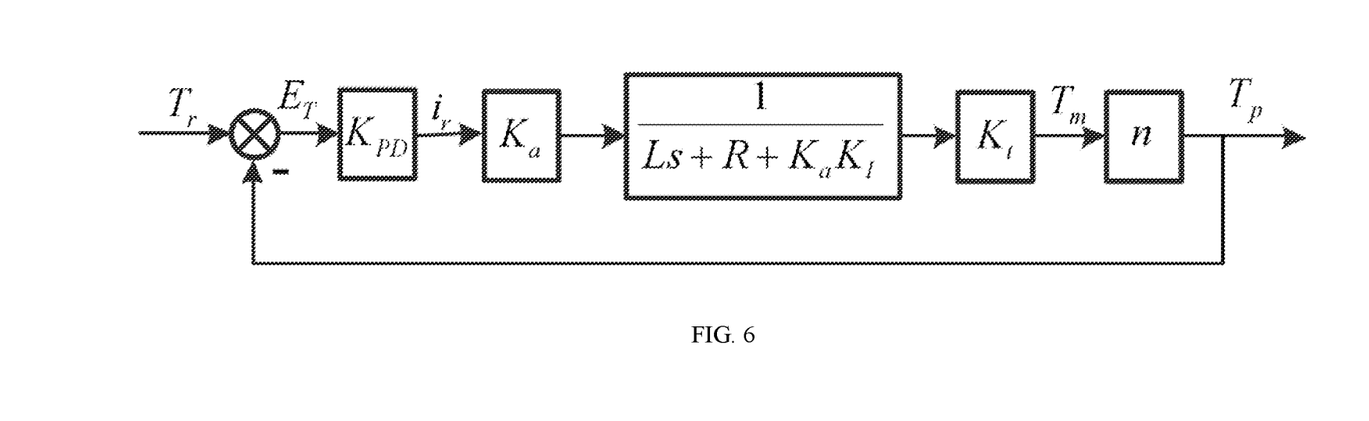
FIG. 6 is a functional block diagram of the joint torque control system in the present disclosure after equivalent transformation of FIG. 5.

The influence of the load parameters on the output torque is effectively eliminated by the load compensation controller, and equivalent transformation is performed on the whole joint torque control system to obtain a transformed joint torque control functional block diagram, as shown in FIG. 6.

An open-loop transfer function of the robot joint torque control system is:

$$G(s) = \frac{T_p}{E_T} = \frac{nK_tK_aK_{PD}}{Ls + R + K_aK_t} = \frac{\frac{nK_tK_aK_{PD}}{R + K_aK_t}}{\frac{s}{\omega} + 1} = \frac{K_a}{\frac{s}{\omega} + 1} \tag{8}$$

in the equation, a corner frequency of an inertial element:

$$\omega = \frac{R + K_aK_t}{L},$$

and an open-loop gain $$K_o = \frac{K_{PD}nK_tK_a}{R + K_aK_t}.$$

Figure 7:
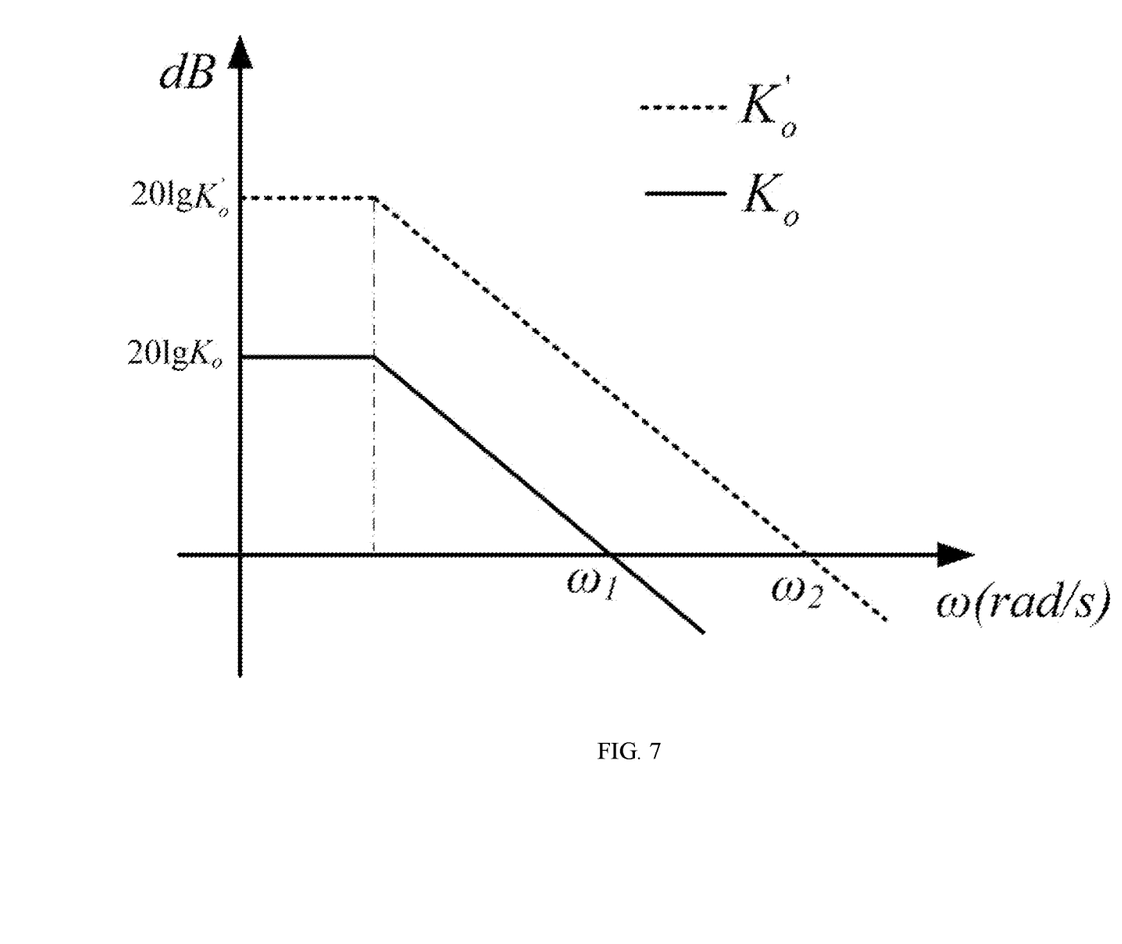
FIG. 7 is an open-loop Bode diagram of the joint torque control system in the present disclosure.

The system is a typical inertial element, and when the PD controller parameter $K_{PD}$ is adjusted, the open-loop gain of the system changes accordingly, and a Bode diagram thereof also changes. As shown in FIG. 7, when the open-loop gain $K_o$ increased to $K_o'$; that is, $K_o < K_o'$, an open-loop Bode diagram of the joint torque control system moves up as a whole, so that a cutoff frequency when the system passes through a 0 db line increases; that is, $\omega_1 < \omega_2$, where $\omega_1$ is the cutoff frequency of the system when the open-loop gain is $K_O$, and $\omega_2$ is the cutoff frequency of the system when the open-loop gain is $K_O'$; since an open-loop cutoff frequency of a Bode diagram of the open-loop transfer function is a system bandwidth, the system bandwidth increases, thereby enhancing rapidity of the system and improving control performance of the system.

The described embodiments are preferred embodiments of the present disclosure, but the present disclosure is not limited to the aforementioned embodiments. Any obvious improvements, substitutions or modifications that can be made by those skilled in the art without departing from the essential content of the present disclosure shall fall within the protection scope of the present disclosure.

What is claimed is:

1. A load compensation method for a robot joint torque control system, comprising accumulating a current $i_f$ whose joint-end velocity is compensated for by a load compensation controller and an original current loop input instruction $i_r$, and then using the accumulated current as a current loop input instruction of a joint torque control system to compensate for an influence of load parameters on an output torque of the joint torque control system;

wherein an output voltage $U_c$ of a servo motor of the joint torque control system is:

$$U_c = K_a(i_r - K_l i_a)$$

where $K_a$ is a current loop control parameter, $i_r$ is a current loop input instruction, $K_l$ is a circuit loop feedback coefficient of the servo motor, and $i_a$ is the actual accumulated current value; the current loop input instruction $i_r$ is obtained by multiplying a joint torque error $E_T$ and a PD controller parameter $K_{PD}$, and the joint torque error $E_T$ is obtained by subtracting a given torque $T_r$ of the joint and an actual torque $T_p$ of the joint end;
wherein voltage balance equation of the servo motor is:

$$U_c = E + L\frac{di_a}{dt} + Ri_a$$

where E is a counter electromotive force of the servo motor, and $$E = nK_v\frac{d\theta}{dt},$$

is a reduction ratio of the gear reducer, $K_v$ is a velocity feedback coefficient of the servo motor, θ is an actual position of the joint end, $$\frac{d\theta}{dt}$$

is an actual velocity of the joint end, L is an inductance of the servo motor, and R is a resistance of the servo motor;
wherein the load compensation controller is $$G_f(s) = \frac{nK_v}{K_a},$$

wherein n is a reduction ratio of a gear reducer, $K_v$ is a velocity feedback coefficient of a servo motor, and $K_a$ is a current loop control parameter;
an open-loop transfer function of the joint torque control system is:

$$G(s) = \frac{T_p}{E_T} = \frac{nK_tK_aK_{PD}}{Ls+R+K_aK_t} = \frac{\frac{nK_tK_aK_{PD}}{R+K_aK_t}}{\frac{s}{\omega}+1} = \frac{K_a}{\frac{s}{\omega}+1}$$

wherein a corner frequency of an inertial element:

$$\omega = \frac{R+K_aK_t}{L},$$

an open-loop gain $$K_o = \frac{K_{PD}nK_tK_a}{R+K_aK_t},$$

$K_{PD}$ is a PD controller parameter, $K_t$ is a torque coefficient of the servo motor, L is an inductance of the servo motor, and R is a resistance of the servo motor.

2. The load compensation method for the robot joint torque control system according to claim 1, wherein when the PD controller parameter $K_{PD}$ is increased, the open-loop gain $K_o$ of the system increases accordingly, and a cutoff frequency when the joint torque control system passes through a 0 db line increases; that is, a system bandwidth increases, thereby improving rapidity of the system.

3. A joint torque control system according to claim 1, comprising a joint body and a control system, wherein the joint body comprises a servo motor, a gear reducer, a torque sensor, and an absolute encoder, wherein an output shaft of the servo motor is rigidly and fixedly connected to the gear reducer, the gear reducer is rigidly connected to a joint-end load by means of the torque sensor, and the absolute encoder is mounted at the joint-end load; the control system comprises a first comparator, a torque loop controller, a second comparator, and a current loop controller, wherein the first comparator, the torque loop controller, the second comparator, and the current loop controller are sequentially in signal connection.

4. The joint torque control system according to claim 3, wherein the torque sensor is used for detecting an actual torque of a joint end; a current sensor is mounted inside the servo motor and used for detecting an actual output current of the servo motor; and the absolute encoder is used for detecting an actual position of the joint-end load.

5. The joint torque control system according to claim 4, wherein in the control system, a given current and the actual output current of the servo motor are compared and subtracted, and pass through the second comparator to control current output of the servo motor and form an internal current loop; a given torque and the actual torque of the joint end are compared and subtracted, and then pass through the first comparator and the internal current loop to control joint torque output and form an external torque loop.

6. The joint torque control system according to claim 3, wherein when the PD controller parameter $K_{PD}$ is increased, the open-loop gain $K_o$ of the system increases accordingly, and a cutoff frequency when the joint torque control system passes through a 0 db line increases; that is, a system bandwidth increases, thereby improving rapidity of the system.

\* \* \* \* \*